US007127238B2

(12) United States Patent
Vandermeijden et al.

(10) Patent No.: US 7,127,238 B2
(45) Date of Patent: Oct. 24, 2006

(54) METHOD AND APPARATUS FOR USING CALLER ID INFORMATION IN A BROWSER OF A MOBILE COMMUNICATION DEVICE

(75) Inventors: Tom R. Vandermeijden, Pacifica, CA (US); Adam H. E. Eberbach, San Francisco, CA (US)

(73) Assignee: Openwave Systems Inc., Redwood City, CA (US)

(*) Notice: Subject to any disclaimer, the term of this patent is extended or adjusted under 35 U.S.C. 154(b) by 446 days.

(21) Appl. No.: 09/945,414

(22) Filed: Aug. 31, 2001

(65) Prior Publication Data

US 2004/0067751 A1   Apr. 8, 2004

(51) Int. Cl.
*H04M 11/00* (2006.01)
(52) U.S. Cl. .............. 455/415; 455/412.1; 379/374.02; 358/1.15
(58) Field of Classification Search ................ 455/405, 455/406, 408, 412.1, 412.2, 414.1, 415, 556.1, 455/456.1–456.3, 567, 457, 517, 552.1, 556.2, 455/414.4; 709/230; 319/354, 142.01; 701/209; 379/28.19, 215.01, 373.02, 265.02, 379/374.02; 705/26; 358/1.15
See application file for complete search history.

(56) References Cited

U.S. PATENT DOCUMENTS

| | | | |
|---|---|---|---|
| 5,485,505 A | 1/1996 | Norman et al. | |
| 5,586,260 A | 12/1996 | Hu | |
| 5,603,084 A | 2/1997 | Henry, Jr. et al. | |
| 5,673,322 A | 9/1997 | Pepe et al. | |
| 5,719,918 A | 2/1998 | Serbetciouglu et al. | |
| 5,727,159 A | 3/1998 | Kikinis | |
| 5,732,074 A | 3/1998 | Spaur et al. | |
| 5,742,905 A | 4/1998 | Pepe et al. | |
| 5,809,415 A | 9/1998 | Rossmann | |
| 5,812,953 A | 9/1998 | Griffith et al. | |
| 5,841,764 A | 11/1998 | Roderique et al. | |
| 5,848,064 A | 12/1998 | Cowan | |
| 5,875,394 A | 2/1999 | Daly et al. | |

(Continued)

FOREIGN PATENT DOCUMENTS

EP    0804045 A2    10/1997

(Continued)

OTHER PUBLICATIONS

"Openwave™ Download Fun," pp. 1-2, downloaded from http://www.openwave.com/products/platform_services/downloaded_fun/index.html, Aug. 31, 2001.

(Continued)

*Primary Examiner*—Fan Tsang
*Assistant Examiner*—Md S. Elahee
(74) *Attorney, Agent, or Firm*—Blakely, Sokoloff, Taylor & Zafman, LLP

(57) ABSTRACT

A mobile telephone comprises a telephony unit to process wireless telephony signals and a browser to enable the user to navigate hypermedia information via a wireless network. The telephony unit receives a signal indicating an incoming telephone call with Caller-ID information. The telephony unit provides the Caller-ID information to the browser, which uses the Caller-ID information to identify an action or data previously associated with the Caller-ID information. In one embodiment, the browser looks up ring tone data associated with the Caller-ID information and provides the ring tone data to the telephony unit, which causes a ring tone to be generated based on the ring tone data. Distinctive ring tones may be associated with particular callers or groups of callers. The browser may request ring tone data from a remote server over the wireless network.

70 Claims, 11 Drawing Sheets

U.S. PATENT DOCUMENTS

| | | | |
|---|---|---|---|
| 5,943,399 A | 8/1999 | Bannister et al. | |
| 5,956,636 A | 9/1999 | Lipsit | |
| 6,018,654 A * | 1/2000 | Valentine et al. | 455/414.4 |
| 6,031,830 A | 2/2000 | Cowan | |
| 6,049,821 A | 4/2000 | Theriault et al. | |
| 6,052,442 A * | 4/2000 | Cooper et al. | 379/88.19 |
| 6,065,120 A | 5/2000 | Laursen et al. | |
| 6,094,587 A * | 7/2000 | Armanto et al. | 455/567 |
| 6,138,009 A | 10/2000 | Birgerson | |
| 6,138,158 A | 10/2000 | Boyle et al. | |
| 6,148,405 A | 11/2000 | Liao et al. | |
| 6,151,628 A | 11/2000 | Xu et al. | |
| 6,173,316 B1 | 1/2001 | De Boor et al. | |
| 6,195,366 B1 | 2/2001 | Kayashima et al. | |
| 6,195,546 B1 | 2/2001 | Leung et al. | |
| 6,195,547 B1 | 2/2001 | Corriveau et al. | |
| 6,233,577 B1 | 5/2001 | Ramasubramani et al. | |
| 6,233,608 B1 | 5/2001 | Laursen et al. | |
| 6,253,326 B1 | 6/2001 | Lincke et al. | |
| 6,266,539 B1 * | 7/2001 | Pardo | 455/556.2 |
| 6,275,693 B1 | 8/2001 | Lin et al. | |
| 6,295,291 B1 | 9/2001 | Larkins | |
| 6,311,057 B1 * | 10/2001 | Barvesten | 455/415 |
| 6,343,323 B1 | 1/2002 | Kalpio et al. | |
| 6,366,791 B1 * | 4/2002 | Lin et al. | 455/567 |
| 6,418,330 B1 | 7/2002 | Lee | |
| 6,421,781 B1 | 7/2002 | Fox et al. | |
| 6,456,852 B1 | 9/2002 | Bar et al. | |
| 6,493,743 B1 | 12/2002 | Suzuki | |
| 6,501,967 B1 * | 12/2002 | Makela et al. | 455/567 |
| 6,516,203 B1 * | 2/2003 | Enzmann et al. | 455/556.1 |
| 6,647,260 B1 | 11/2003 | Dusse et al. | |
| 6,668,055 B1 | 12/2003 | Marwell et al. | |
| 6,671,714 B1 | 12/2003 | Weyer et al. | |
| 6,687,242 B1 * | 2/2004 | Enzmann et al. | 370/352 |
| 6,697,484 B1 * | 2/2004 | Fleming, III | 379/354 |
| 6,714,637 B1 * | 3/2004 | Kredo | 379/215.01 |
| 6,782,208 B1 | 8/2004 | Lundholm et al. | |
| 6,795,702 B1 * | 9/2004 | Sennett | 455/414.1 |
| 6,839,424 B1 * | 1/2005 | Burnett | 379/265.02 |
| 6,882,860 B1 * | 4/2005 | Kim | 455/553.1 |
| 6,909,910 B1 | 6/2005 | Pappalardo et al. | |
| 7,012,708 B1 * | 3/2006 | Tamaru | 358/1.15 |
| 2001/0001160 A1 | 5/2001 | Schoff et al. | |
| 2001/0024965 A1 * | 9/2001 | Hayashi | 455/567 |
| 2001/0032254 A1 | 10/2001 | Hawkins | |
| 2001/0055299 A1 | 12/2001 | Kelly | |
| 2002/0009184 A1 * | 1/2002 | Shnier | 379/142.01 |
| 2002/0019225 A1 | 2/2002 | Miyashita | |
| 2002/0046299 A1 * | 4/2002 | Lefeber et al. | 709/318 |
| 2002/0052224 A1 * | 5/2002 | Yoon | 455/567 |
| 2002/0058499 A1 * | 5/2002 | Ortiz | 455/412 |
| 2002/0068554 A1 | 6/2002 | Dusse | |
| 2002/0123335 A1 | 9/2002 | Luna et al. | |
| 2002/0128036 A1 * | 9/2002 | Yach et al. | 455/552 |
| 2002/0194352 A1 * | 12/2002 | Ho et al. | 709/230 |
| 2002/0194584 A1 | 12/2002 | Suorsa et al. | |
| 2003/0003935 A1 * | 1/2003 | Vesikivi et al. | 455/517 |
| 2003/0023371 A1 * | 1/2003 | Stephens | 701/209 |
| 2003/0023849 A1 | 1/2003 | Martin, Jr. et al. | |
| 2003/0026416 A1 * | 2/2003 | Fusco | 379/374.02 |
| 2004/0066920 A1 | 4/2004 | Vandermeijden | |
| 2005/0049002 A1 * | 3/2005 | White et al. | 455/556.1 |

FOREIGN PATENT DOCUMENTS

| | | |
|---|---|---|
| EP | 1043905 A2 | 10/2000 |
| EP | 1043906 A2 | 10/2000 |
| EP | 1091606 A2 | 4/2001 |
| EP | 1043906 A3 | 1/2002 |
| EP | 1043905 A3 | 9/2002 |
| WO | WO 95/15065 A1 | 6/1995 |
| WO | WO 97/13382 A1 | 4/1997 |
| WO | WO 97/28662 A1 | 8/1997 |
| WO | WO 98/56202 A2 | 12/1998 |
| WO | WO 98/58506 A1 | 12/1998 |
| WO | WO 99/05613 A1 | 2/1999 |
| WO | WO 99/07173 A1 | 2/1999 |
| WO | WO 00/46963 A1 | 8/2000 |
| WO | WO 00/56015 A1 | 9/2000 |
| WO | WO 01/39526 A1 | 5/2001 |
| WO | WO 01/58110 A2 | 8/2001 |
| WO | WO 01/58110 A3 | 8/2001 |
| WO | WO 01/69891 A1 | 9/2001 |
| WO | WO 01/69903 A1 | 9/2001 |

OTHER PUBLICATIONS

"Openwave™ Download Fun," pp. 1-2, Jun. 2001.

Harrington, D., et al.: "An Architecture For Describing SNMP Management Frameworks", Apr. 1999, pp. 1-62, XP-002241315.

"Mobile Management Server", pp. 1-4, downloaded from http://www.phone.com/products/mms/html on Mar. 5, 2001.

Davin, J., et al.: "SNMP Administrative Model", Jun. 1992, pp. 1-35, XP-002272696.

Wijnen, B., et al.: "View-Based Access Control Model (VACM) For The Simple Network Management Protocol (SNMP)", Jan. 1998, XP-002272695, pp. 1-36.

* cited by examiner

METHOD AND APPARATUS FOR USING CALLER ID INFORMATION IN A BROWSER OF A MOBILE COMMUNICATION DEVICE

FIELD OF THE INVENTION

The present invention pertains to mobile telephones and other wireless communication devices. More particularly, the present invention relates to a method and apparatus for using Caller-ID information in a browser of a mobile telephone or other wireless communication device.

BACKGROUND OF THE INVENTION

Wireless telecommunications is the technology upon which cellular telephones and many other commonly used mobile communications and computing devices are based. This technology has undergone rapidly advancements in recent years and has been adopted worldwide with unprecedented speed. Cellular telephony in particular has the benefit of allowing people to communicate with each other from virtually any location. However, this technology is also increasingly impinging upon users' privacy.

In the past, one could escape the often-intrusive ring of the telephone simply by leaving one's home or the office. Driving in one's car was sometimes a welcome (albeit short-lived) escape from the telephone. Now, however, as people carry their cellular telephones with them almost everywhere they go, they can be reached at virtually any time and in virtually any place by anyone who has their mobile telephone number. More and more commonly, the caller is unknown to the user or may not be someone with whom the user wishes to speak. Thus, for many users, the greater accessibility which a cellular telephone provides also threatens to make the device a nuisance.

To mitigate this effect, many newer-generation cellular telephones have display screens and are equipped to receive and display information provided by a caller identification service ("Caller-ID", also known as Calling Number Identification, or "CNID"). Currently there are two types of Caller-ID services for wireless devices. The first (often referred to as "basic" service) only returns the calling number or an error message and the date/time of the call. The second ("enhanced" Caller-ID) also may return the directory information about the calling number. At a minimum, the name of the subscriber is returned. The subscriber is not necessarily the same as the caller, however; the telephone company has no way to determine who is actually on the line.

It is often inconvenient, however, for the user to have to look at the display screen, and it may be quite hazardous to do so if, for example, the user is driving an automobile. Furthermore, the Caller-ID information sometimes includes the telephone number of the caller but not the caller's name, as noted above. In such cases, if the user has a large number of personal contacts or a poor memory, the user may not recognize the telephone number, even though the caller may be someone with whom the user would like to speak. Accordingly, a better solution to the problem of identifying callers on mobile telephones is needed.

SUMMARY OF THE INVENTION

The present invention includes a method and apparatus for executing a browser in a mobile communication device configured to communicate voice and data over a wireless network. The browser is to enable a user of the mobile communication device to access and navigate hypermedia data. The method includes the browser receiving Caller-ID information in response to the mobile communication device receiving a signal indicating an incoming voice call over a wireless network, and the browser automatically executing a predetermined action based on the Caller-ID information.

The present invention can be applied to increase the usefulness of a mobile telephone and to better protect the privacy of its user. Among other applications, by allowing distinctive ring tones to be associated with particular callers or groups of callers, based on Caller-ID information, the present invention makes it easier for the user to identify a caller. Other features and advantages of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
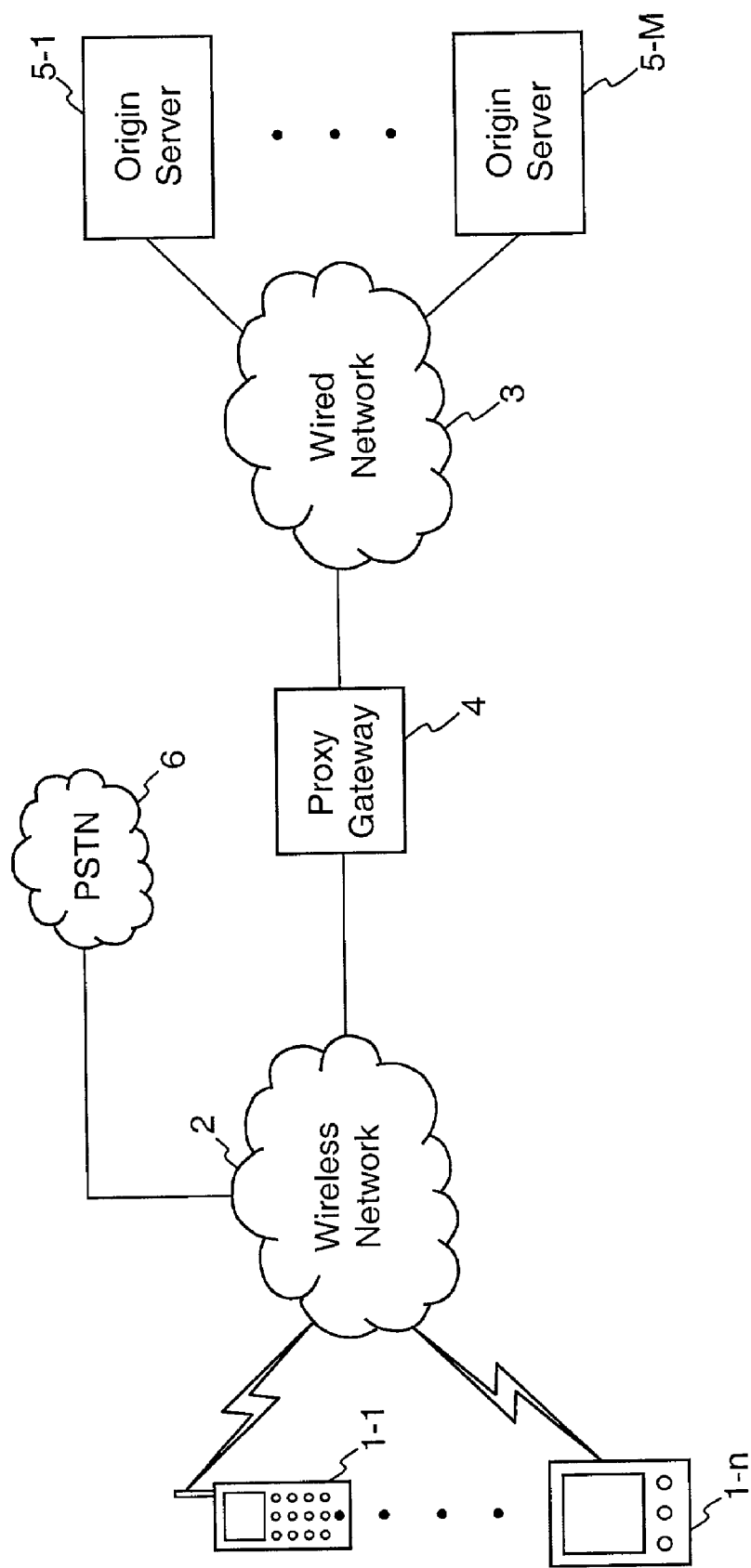
FIG. 1 shows a network environment in which the present invention can be implemented.

A method and apparatus for using caller identification (ID) information in a browser of a mobile telephone or other communication device are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. For example, a feature, structure, act, etc. described in one embodiment may also be included in other embodiments. Thus, the present invention can include a variety of combinations and/or integrations of the embodiments described herein.

The technique described herein can be applied to increase the usefulness of a mobile telephone and to better protect the privacy of its user. Among other applications, by allowing distinctive ring tones to be associated with particular callers or groups of callers, based on Caller-ID information, the present invention makes it easier for the user to identify a caller. In addition, the present invention provides a technique which allows a user's contact database to be incrementally and automatically populated each time the user places or receives a call using the wireless handset. This technique makes the contact database of a wireless handset more usable for those users who are unable or unwilling to enter or download their contact data into the contact database.

As described further below, in one embodiment a mobile telephone includes a telephony unit to process telephony signals and a browser to enable the user to access and navigate hyperlinked ("hypermedia") information stored on a remote data network, such as the Internet, via a wireless network. When the telephony unit receives a signal indicating an incoming telephone call along with Caller-ID information, instead of immediately ringing the telephone, the telephony unit activates the browser and passes the Caller-ID information to the browser.

The browser uses the Caller-ID information to identify an action or data of a predetermined type, previously associated with that specific Caller-ID information. The data or an indication of the action may be stored in the user's contact database ("address book") within the mobile telephone. One example of such data is ring tone data for generating a distinctive ring tone. One example of such an action is initiation of an outgoing telephone call. After the browser identifies the data or action associated with the Caller-ID information, the browser may use the data and/or may execute the action, if the browser is configured to do so. Otherwise, the browser may simply pass the data or indicate the action to the telephony unit, or any other unit in the mobile telephone that is responsible for using the data or executing the action. If the browser cannot locate the data locally within the mobile telephone, the browser attempts to obtain the data from a remote server over the wireless network.

Thus, in one embodiment, in response to receiving the Caller-ID information from the telephony unit, the browser looks up stored ring tone data previously associated with the telephone number of the incoming call and provides the ring tone data to the telephony unit. The telephony unit then causes a speaker on the mobile telephone to output a ring tone based on the ring tone data.

The ring tone data may be stored in the user's contact database in the mobile telephone. The contact database may be stored in the well-known vCard format, as defined by Internet Mail Consortium's (IMC) Requests for Comments (RFCs) 2425 and 2426, which are incorporated herein by reference, and which define vCard version 3.0. The vCard format is extensible and allows for the addition of database fields. The technique described herein calls for the addition of fields in the contact database to store ring tone data, uniform resource locator (URL) locations of ring tone data, and (optionally) a mute override flag. URLs are used to locate sets of ring tone data that exceed the maximum vCard size. Ring tone data may be encoded in any of various conventional forms for storing audio files, such as MP3 or .wav files.

The ring tone data may be downloaded from a remote ring tone server via the wireless network. In that case, distinctive ring tones may be assigned by either the user of the mobile telephone, potential callers (using, e.g., vCard extensions), or third parties. The ring tones may be stored on the ring tone server prior to a call and selected through a standard World Wide Web interface. The ring tone server may also provide a facility which allows mobile telephone users and potential callers to upload ring tone data to the ring tone server, for subsequent downloading and use in mobile telephones by themselves and others.

The user may wish to have a unique ring tone for each caller in his contact database and/or he may wish to organize certain callers into groups (e.g., family, friends, customers, vendors) for purposes of assigning ring tones. In one specific implementation, the user can assign a ring tone which sounds like a particular musical instrument for everyone in a particular group of callers; the user can further assign a different melody to each caller in that group. In that case, the browser inputs the received Caller-ID information to a melody synthesis algorithm, which generates a brief tune using the instrument sound assigned to the caller's group.

Numerous other variations upon this technique are possible, as will be apparent from the following description. For example, the technique can be used for purposes other than identifying and playing distinctive ring tones. In addition, it will be recognized that the described technique can be implemented advantageously in mobile devices other than mobile telephones, such as two-way pagers, personal digital assistants (PDAs), and other similar devices.

As is well-known, the Internet is a global network of computer systems that provides computer users with near real-time delivery of information on virtually any topic imaginable from a large number of sources. Common uses of the Internet include the exchange of electronic mail (e-mail) messages, instant messaging, and browsing the World Wide Web. In recent years, computer network technology and wireless telecommunications technology have begun to merge, such that newer-generation cellular telephones and other mobile devices are usable as entry points to the Internet.

Devices used to access the Internet (or intranets) generally have certain features in common, whether they sit on a desktop or are held in the palm of the hand. One such feature is that they may be used to display and navigate hyperlinked content, such as web pages from the World Wide Web. Devices with such capability include software known as a browser, which allows the user to access and navigate the hyperlinked content. In a mobile device, this software is sometimes referred to as a microbrowser or minibrowser, because the software consumes much less memory than a conventional PC browser. Nonetheless, this software is simply a particular type of browser and, thus, may be referred to simply as a browser.

To access web pages on the Internet, network servers and network personal computers (PCs) normally use standard web protocols and mark-up languages, such as hypertext transport protocol (HTTP) and hypertext markup language (HTML), respectively. Mobile devices, on the other hand, generally use wireless protocols such as wireless access protocol (WAP) or handheld device transport protocol (HDTP) and wireless markup languages such as wireless markup language (WML) and handheld device markup language (HDML) to accomplish similar tasks.

Refer now to FIG. 1, which shows a network environment in which the present invention can be implemented. A number (N) of mobile ("wireless") devices 1-1 through 1-N operate on a wireless telecommunications network 2 (or simply "wireless network 2"). The wireless network may be, for example, a cellular digital packet data (CDPD) network, a global system for mobile (GSM) communications network, a time division multiple access (TDMA)

network, a personal digital cellular (PDC) network, or a personal handy-phone system (PHS) network. Each of the wireless devices 1 may be, for example, any of: a cellular telephone, a personal digital assistant (PDA), a two-way pager, or any other hand-held, wireless communications/computing device. The wireless network 2 is coupled to the public switched telephone network (PSTN) 6. Hence, through the wireless network 2, the user of mobile telephone 1-1 can have telephonic communication with users of other mobile telephones and/or users of conventional wireline telephones on the PSTN 6.

The wireless network 2 is also coupled to a conventional wired computer network 3 through a proxy gateway 4. The wired network 3 may be, for example, the Internet, a campus intranet, a wide area network (WAN), a local area network (LAN), or a combination thereof. The proxy gateway 4 generally serves as a link between the wireless network 2 and the wired network 3. The proxy gateway 4 uses well-known techniques to enable communication between the wireless devices 1 and a number (M) of server processing systems ("servers") 5-1 through 5-M operating on the wired network 3. The physical platforms which embody the proxy gateway 4 and servers 5 may include, for example, conventional server-class computer systems and/or personal computers (PCs). At least some of the servers 5 may be conventional web servers on the World Wide Web. Accordingly, servers 5 can provide content to the wireless devices 1 in response to requests from the wireless devices 1 and, in some cases, may "push" content to the mobile devices 1.

A proxy feature of proxy gateway 4 proxies requests and responses to requests between the wireless devices 1 and the servers 5. Some of the wireless devices 1 may not support the same protocols or languages used by the servers 5. For example, certain wireless devices 1 might support only wireless markup language (WML) and WAP, while the servers 5 use only hypertext markup language (HTML) or extensible mark-up language (XML) and HTTP. In such cases, a gateway feature of proxy gateway 4 converts/translates between the languages and protocols used by servers 5 and the languages and protocols used by the mobile devices 1 to allow these entities to communicate with each other.

Although the proxy gateway 4 is shown as a single network entity, the proxy and gateway functions can be distributed between two or more physical platforms. Furthermore, both functions may not be necessary in certain network implementations.

Figure 2:
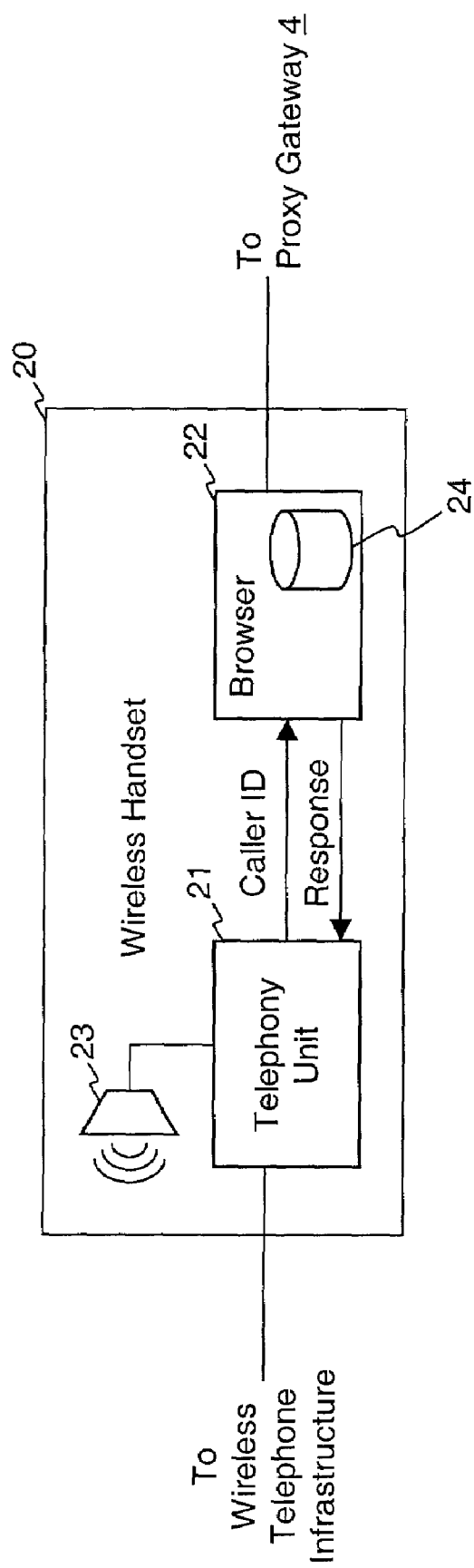
FIG. 2 is a high-level block diagram of a wireless handset.

The following description focuses on a cellular telephone as an example of a wireless device 1, to facilitate description. However, the described techniques are also applicable to other types of mobile devices, as noted above. FIG. 2 shows an abstraction of a cellular telephone (hereinafter the "wireless handset") 20. As shown, the wireless handset 20 includes a telephony unit 21 and a browser 22, operatively coupled to each other. The telephony unit 21 includes elements to allow real-time voice (telephonic) communication using the wireless handset 20. Thus, the telephony unit 21 provides the wireless handset 20 with an interface (via various RF circuitry and related components) to the telephone infrastructure of the wireless network 2. A description of the details of the telephony unit 21 is not necessary for an understanding of the present invention, and such details are familiar to those skilled in the relevant art.

The browser 22 enables the user of the wireless handset 20 to access and navigate hyperlinked information of various types stored in, for example, the servers 5 on the wired network 3. The browser 22 generally interfaces with the proxy gateway 4 (via various RF circuitry and related components) for purposes of accessing such information. The browser 22 may be a conventional browser designed for use in a cellular telephone or other wireless communication device, modified according to the techniques described herein. An example of such a browser is the Openwave Mobile Browser, which is available from Openwave Systems Inc. of Redwood City, Calif.

The telephony unit 21 and the browser 22 each may be hardware, software, or a combination of hardware and software. Furthermore, the telephony unit 21 and browser 22 may share certain elements, especially hardware elements. For purposes of further description, it is assumed that at least the browser 22 is software-based and that the telephony unit 21 is a combination of hardware and software. Thus, in one embodiment the hardware portion of the telephony unit 21 includes a processor, which is also the processor used to execute the browser 22. The composition of the wireless handset 20 is discussed further below in connection with FIG. 9. It is further assumed that the telephony unit 21 and the browser 22 communicate via application program interfaces (APIs).

As shown in FIG. 2, the browser includes a contact database (address book) 24 of the user. Alternatively, the contact database 24 may be stored within the wireless handset 20 separate from (but still accessible to) the browser 22.

Figure 3:
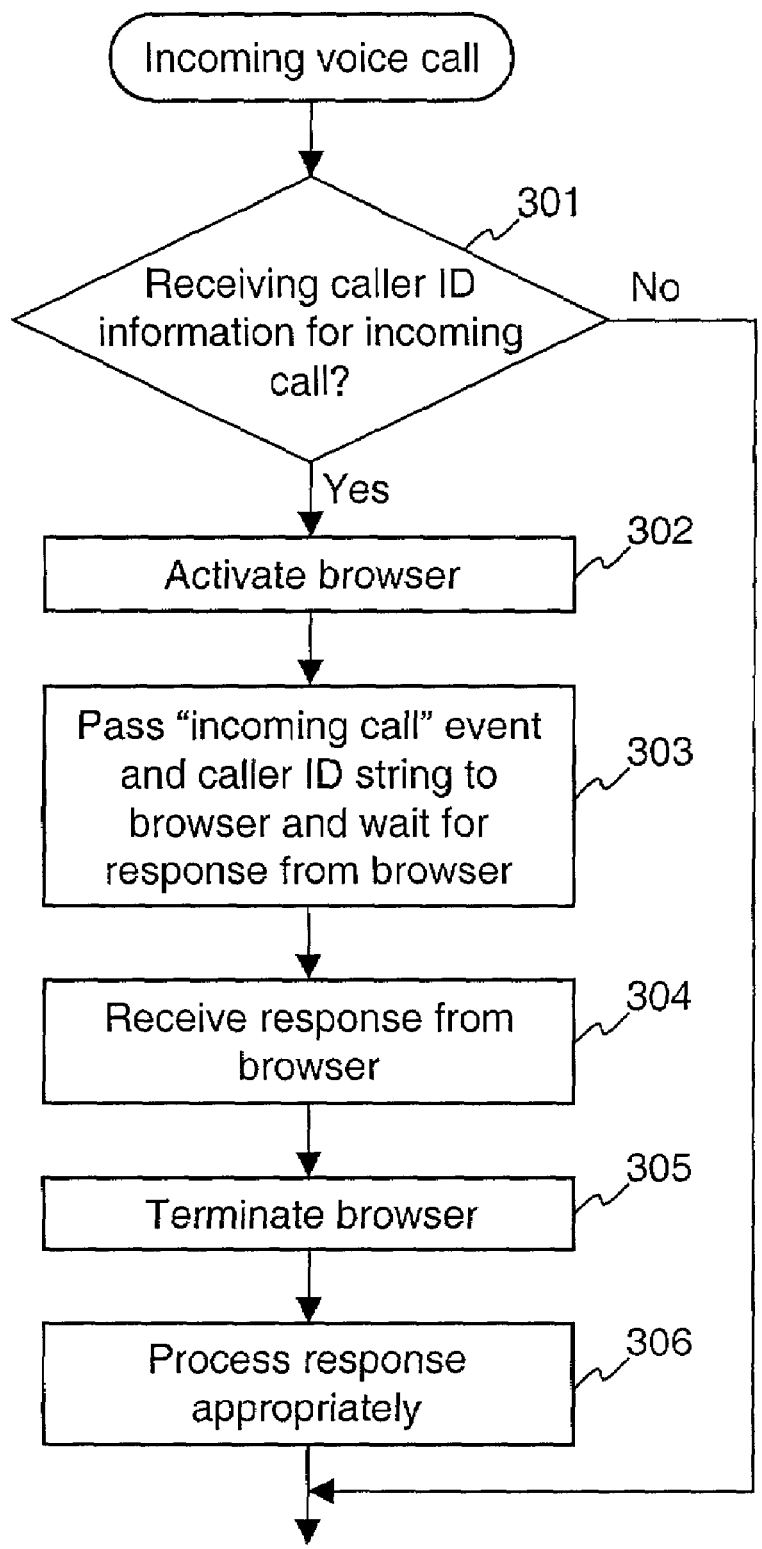
FIG. 3 is a flow diagram showing a process performed by a telephony unit of the wireless handset based on Caller-ID information.

FIG. 3 shows a process that may be performed by the telephony unit 21 in response to receiving a signal indicating an incoming voice call, in accordance with the present invention. The entire process of FIG. 3 will generally take less than a second to execute and is completed before the user is even aware of the incoming call. In response to the signal, at block 301 the telephony unit 21 determines whether it is receiving Caller-ID information for the incoming call. As is well-known, Caller-ID information typically includes the telephone number and/or the name of the caller. Such information is referred to herein (individually or collectively) as the Caller-ID string. If no Caller-ID information is received, the process ends. If Caller-ID information is received, then instead of immediately ringing the telephone, the telephony unit 21 activates the browser 22 at block 302. At block 303, the telephony unit 21 passes an "incoming call" event and the Caller-ID string to the browser 22 and waits for a response from the browser 22. The telephony unit 21 receives a response from the browser 22 at block 304. In response, the telephony unit 21 terminates (deactivates) the browser 22 at block 305 and processes the response appropriately at block 306.

Figure 4:
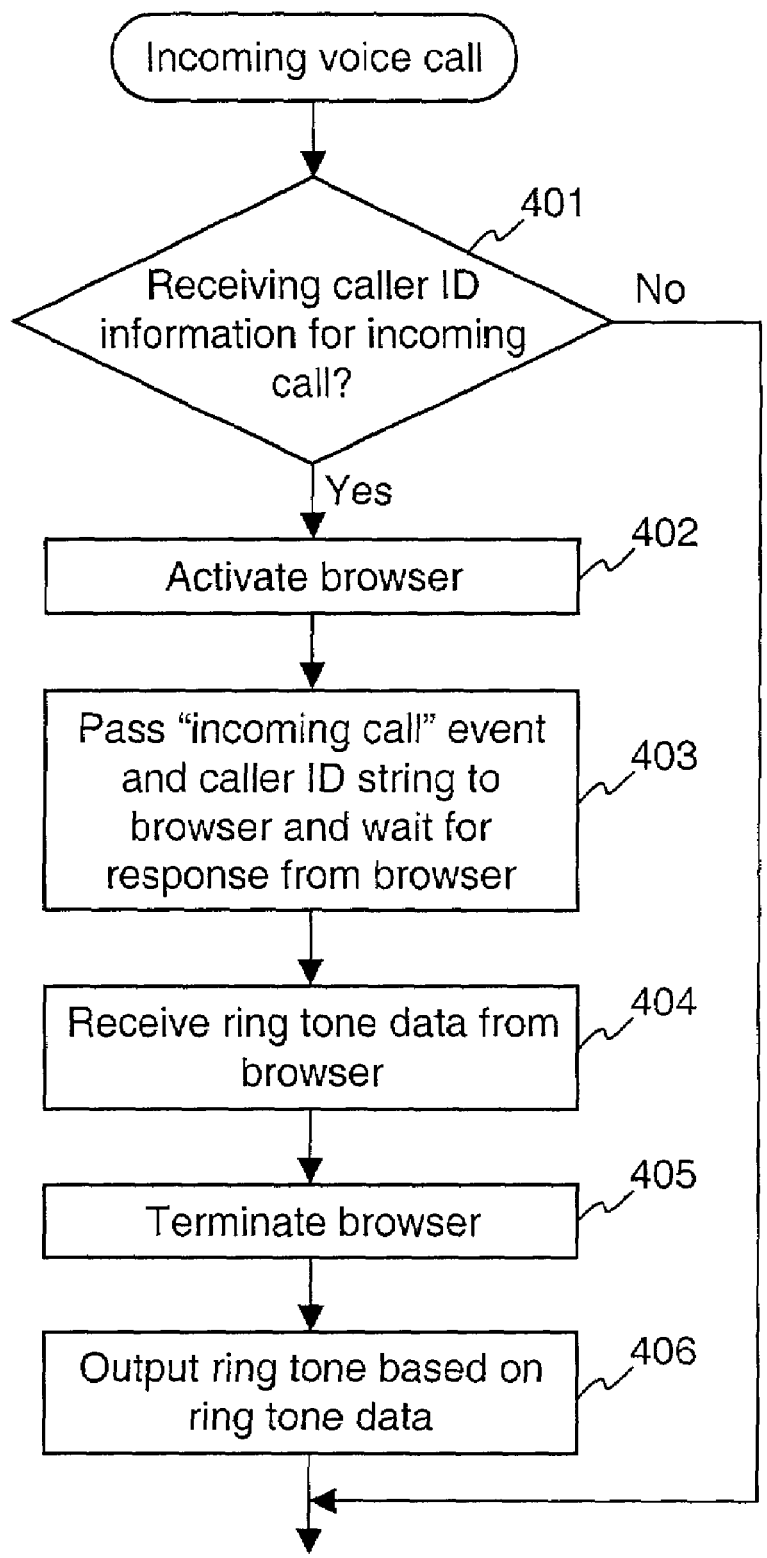
FIG. 4 is a flow diagram showing a process performed by the telephony unit to output a distinctive ring tone based on Caller-ID information.

The content of the response and the specific manner in which it is processed will depend upon the implementation. One such implementation is described now with respect to FIG. 4. FIG. 4 shows a variation of the process of FIG. 3, for an embodiment which allows the use of distinctive ring tones for particular callers or groups of callers. As used herein, the term "ring tone" is defined as any sound designed to signal the existence of an incoming call to the user of the device receiving the call. A ring tone can be, for example, a recorded or synthesized musical melody, recorded or synthesized speech (e.g., recorded speech of the caller), or any other sound effect. Blocks 401 through 406 correspond to blocks 301 through 306 (described above), respectively. In block 404, however, the response from the browser includes ring tone data associated with the Caller-ID string, and in block 406 the telephony unit 21 processes the ring tone data by causing the speaker 23 of the wireless handset 20 to output a ring tone according to the ring tone data.

As noted above, in other embodiments the browser 22 may use the Caller-ID information to locate types of data other than ring tone data. The browser 22 may also use the Caller-ID information to identify (and if appropriate, execute) various types of actions previously associated with the Caller-ID information, such as signaling the telephony unit 21 to initiate an outgoing telephone call. For example, when an international call or other call involving toll charges is received, the predetermined action might include ignoring the incoming call and initiating an outgoing call to the telephone number in the Caller-ID information or a different telephone number previously specified by the user.

Figure 5:
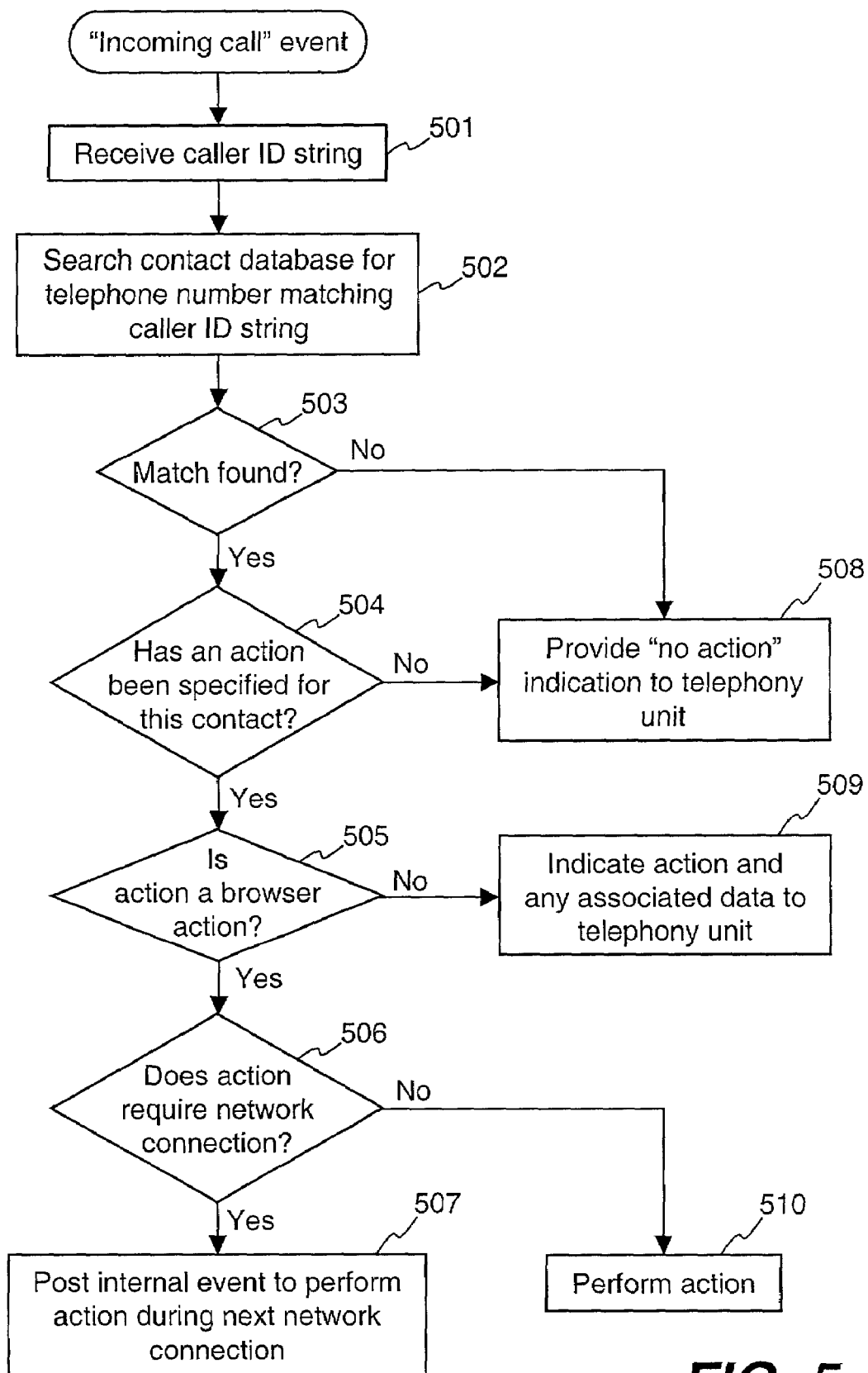
FIG. 5 is a flow diagram showing a browser process for identifying and, if appropriate, performing, an action associated with Caller-ID information.

FIG. 5 is a flow diagram showing a browser process for identifying and, if appropriate, executing, an action previously associated with received Caller-ID information. In one embodiment, this process is implemented as a WML script in a WAP channel. After receiving an "incoming call" event from the telephony unit 21, the browser 22 receives the Caller-ID string at block 501. At block 502 the browser 22 searches the user's contact database 24 for a telephone number (or name) which matches the Caller-ID string. If no match is found, the process ends at block 508, in which the browser 22 returns a "no action" indication to the telephony unit 21. If the match is found, the browser 22 determines at block 504 whether an action has been specified for the contact database entry which matches the Caller-ID string. If no action has been specified, the process ends with block 508, as described above. If an action has been specified for this contact, then at block 505 the browser 22 determines whether the action is one which the browser 22 is capable of executing itself ("a browser action"). If the action is not a browser action, then the process ends at block 509, in which the browser 22 indicates the type of action and provides any associated data to the telephony unit 21 for further handling. If the action is a browser action, and if the action does not require a network connection (block 506), then the browser 22 executes the action at block 510, which ends the process. If the action does require network connection, then at block 507 the browser 22 posts an internal event to perform the action when a data connection is subsequently established over the wireless network. The next time a data connection is established may be, for example, wherein the user of the wireless handset 20 starts a browser session to access the Internet.

At the end of the process, the browser 22 is terminated, as indicated in block 305 of FIG. 3. Note that the browser 22 generally needs to be active for much less than a second to execute the entire process of FIG. 5.

Figure 6A:
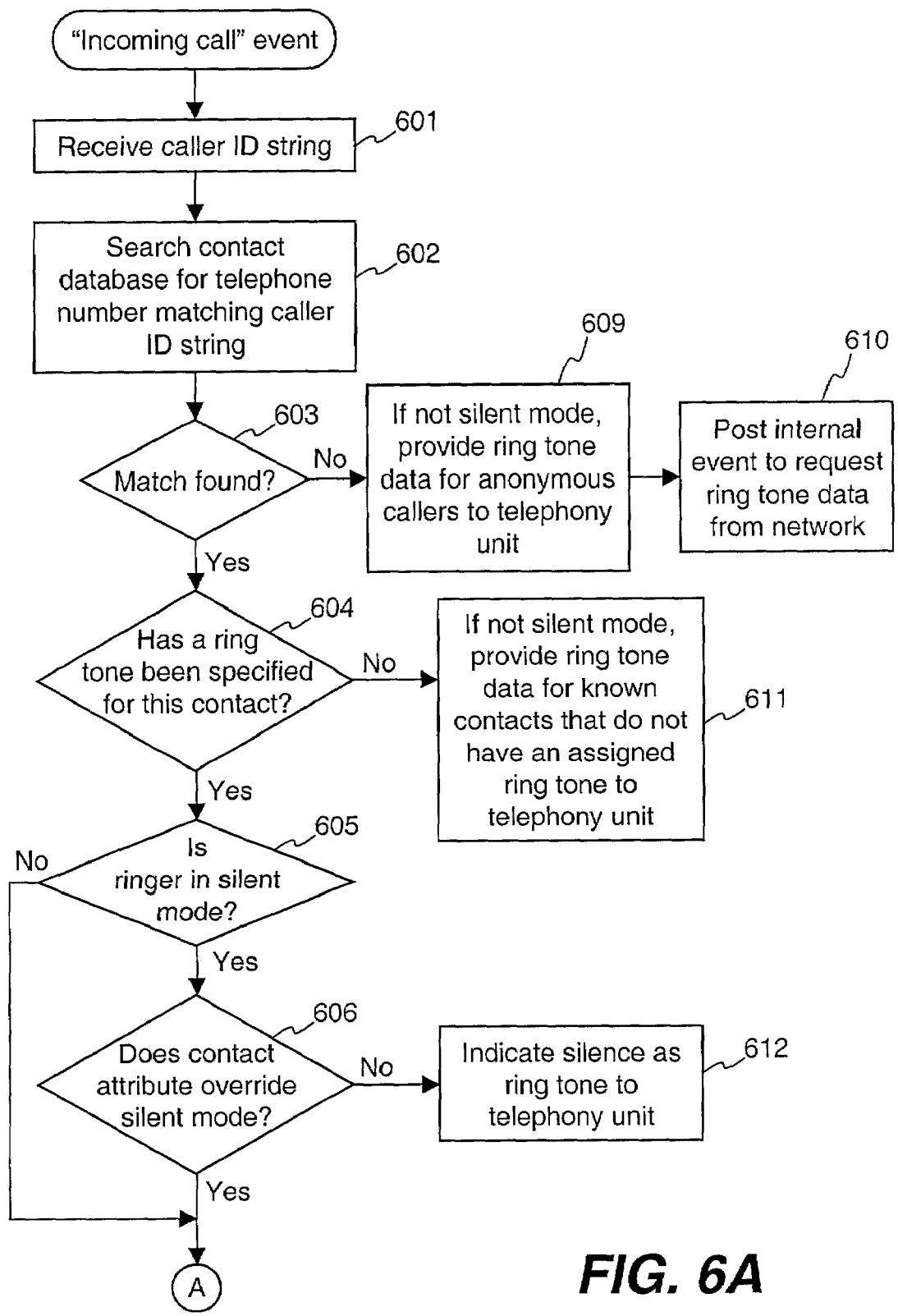
FIGS. 6A and 6B collectively are a flow diagram showing a browser process for identifying distinctive ring tone data associated with Caller-ID information.
Figure 6B:
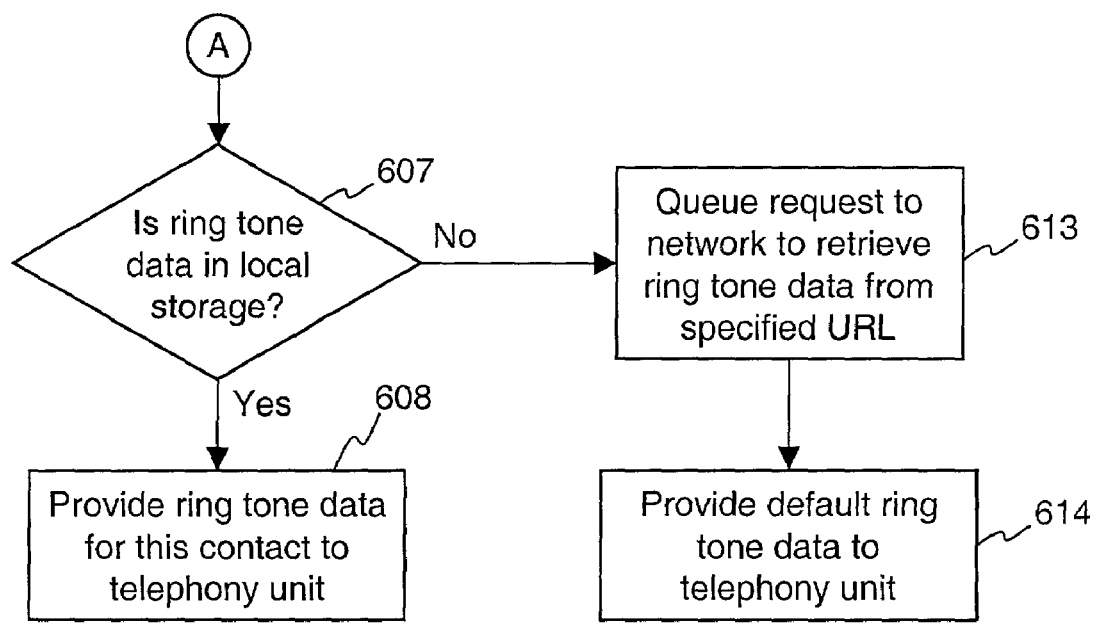

FIGS. 6A and 6B collectively illustrate a variation of the browser process of FIG. 5, to identify distinctive ring tone data associated with Caller-ID information. Blocks 601 through 603 are identical to blocks 501 through 503, respectively. If a match is found for the Caller-ID string in the contact database 24 at block 603, then the browser 22 determines if a ring tone has been specified for the contact at block 604. If a match is not found at block 603, then if the wireless handset 20 is not currently in silent mode, the browser 22 provides ring tone data previously specified for anonymous callers to the telephony unit 21 at block 609. Following block 609, at block 610 the browser 22 posts an internal event to request ring tone data from a remote ring tone server via the wireless network 2 the next time a data connection is established over the network. The handling of this internal event is described further below. This approach is based on the assumption that the incoming call signal is transmitted to the wireless handset before a voice or data channel is established, over a control channel that is unsuitable for communicating a significant amount of data (e.g., ring tone data), as in current telephony systems.

The remote ring tone server may be located using a URL, which may have been previously provisioned in the wireless handset 20. In one embodiment, the ring tone server is part of the proxy gateway 4. Alternatively, the ring tone server may be included in one of the servers 5 or any other processing system coupled (at least indirectly) to the wireless network 2. In any case, a negotiation may occur between the wireless handset 20 and the proxy gateway 4 so that the handset 20 will only be sent ring tone data of a type which it is capable of playing.

If a ring tone has not been specified for this contact (block 604), the process ends with block 611. In block 611, if the wireless handset is not in silent mode, the browser 22 provides to the telephony unit 21 ring tone data previously specified for known contacts that do not have an assigned ring tone. If a ring tone has been specified for this contact (block 604), then at block 605 the browser 22 determines whether the ringer is in silent mode. If the ringer is not in silent mode, the process jumps to block 607, described below. If the ringer is in silent mode, then at block 606 the browser 22 determines whether the matching contact has an attribute which overrides the silent mode.

The wireless handset 20 may have a ring silencer feature, which the user can activate when he does not want to be disturbed by telephone calls. However, there may be a few potential callers with whom the user would wish to speak even if they call when the ringer is silenced. Accordingly, a user-settable field or attribute (e.g., a flag) may be provided in the contact database 24, "break in", to allow specified callers to break-through the silencer. As noted above, the contact database 24 may be stored in vCard format, which allows for the addition of fields.

Referring still to FIG. 6, if the matching contact does not have an attribute which overrides the silent mode, the browser 22 indicates silence as the ring tone to the telephony unit 21 at block 612. If the contact has an attribute which overrides the silent mode, the process continues from block 607, in which the browser 22 determines whether the ring tone data is stored locally within the wireless handset 20 (e.g., in the contact database 24). If the ring tone data is stored locally, the browser 22 provides the ring tone data for this contact to the telephony unit 21 at block 608. If the ring tone data is not stored locally, then at block 613 the browser 22 queues a network request to retrieve ring tone data from the remote ring tone server. Following block 613, the browser 22 provides default ring tone data for this contact to the telephony unit 21 at block 614. The queued request is then submitted over the wireless network 2 the next time a data connection is established over the wireless network 2.

The process of downloading the ring tone data from the ring tone server to the wireless handset 20 may be implemented using any of various conventional techniques. For example, ring tones may be downloaded according to the M-Services Guidelines promulgated by the Global System for Mobile Communications (GSM) Association, as defined in "M-Services Guidelines", GSM Association Permanent Reference Document AA.35, version 3.0.0, May 31, 2001, which is incorporated herein by reference. As another example, ring tones may be provisioned in the wireless handset 20 using a provisioning technique described in co-pending U.S. patent application Ser. No. 09/289,559 of S. Dussee et al., filed on Apr. 9, 1999 and entitled, "Method and System Facilitating Web Based Provisioning of Two-Way Mobile Communications Devices", which is incorporated herein by reference, and which is assigned to Openwave Systems Inc. of Redwood City, Calif.

In the above-described process, it is assumed that if ring tone data is not stored locally in the contact database 24, it is obtained via the wireless network 2 during a subsequent data connection. This approach is based on the assumption that the incoming call signal is transmitted to the wireless handset, before a voice or data channel is established, over a control channel that is unsuitable for communicating data (e.g., ring tone data), as in current telephony systems. Nonetheless, it is contemplated that future or alternative wireless network implementations may allow ring tone data to be sent to the wireless handset 20 over the wireless network 2 concurrently with an incoming call signal.

Figure 7:
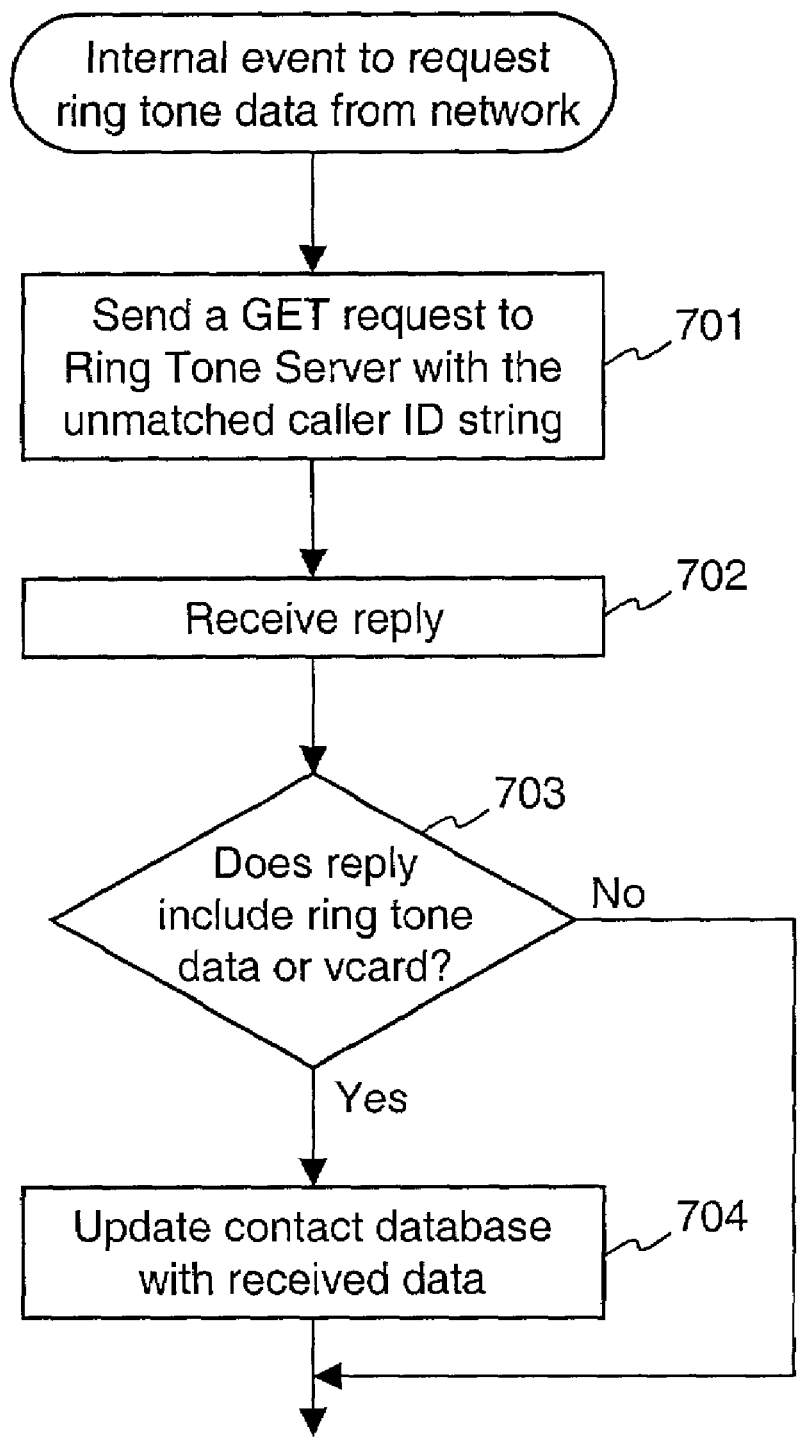
FIG. 7 is a flow diagram showing a browser process of requesting data associated with Caller-ID information from a remote server.

FIG. 7 shows a browser process of requesting data associated with Caller-ID information from a remote server (e.g., a ring tone server), and automatically updating the contact database 24 with the received data, such as may be done in response to the internal event of block 610. As noted, this process is performed when a data connection is established between the wireless handset 20 and a remote processing system over the wireless network 2. At block 701 the browser sends a standard HTTP GET request to the ring tone server with the unmatched Caller-ID string. The browser 22 receives a reply from the ring tone server at block 702. The reply may include the requested ring tone data. The ring tone data may included in a vCard. At block 703 the browser 22 determines whether the reply includes ring tone data and/or a vCard. If it does, the browser 22 updates the entry for this contact in the contact database 24 using the received ring tone data and/or vCard data. Otherwise, the process ends.

In other embodiments, the above-described technique may be extended to automatically update a local contact database in a wireless handset with types of data other than ring tone data, based on Caller-ID information associated with a telephone call. Furthermore, as will now be described, this process may be extended to automatically update a local contact database in response to Caller-ID information contained in outgoing telephone calls as well as incoming telephone calls.

Figure 8A:
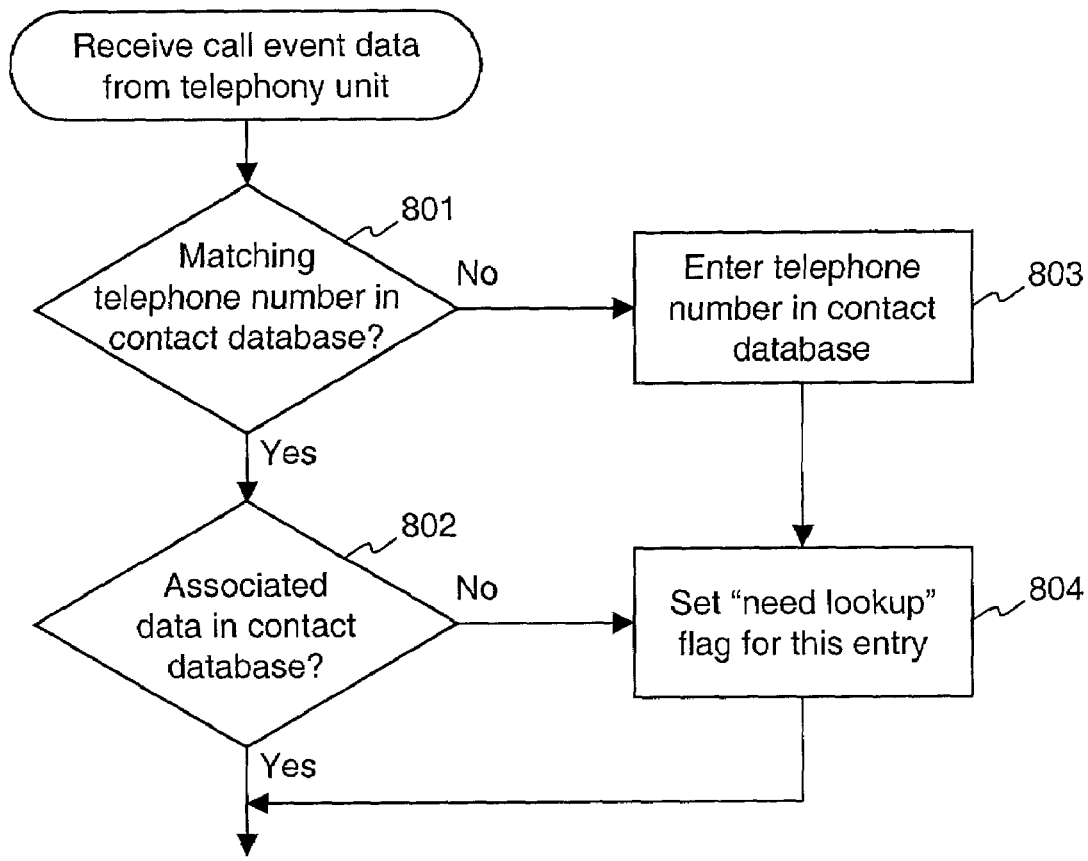
FIGS. 8A and 8B show browser processes for automatically populating a contact database in a mobile device, based on a telephone number in an incoming or outgoing telephone call.
Figure 8B:
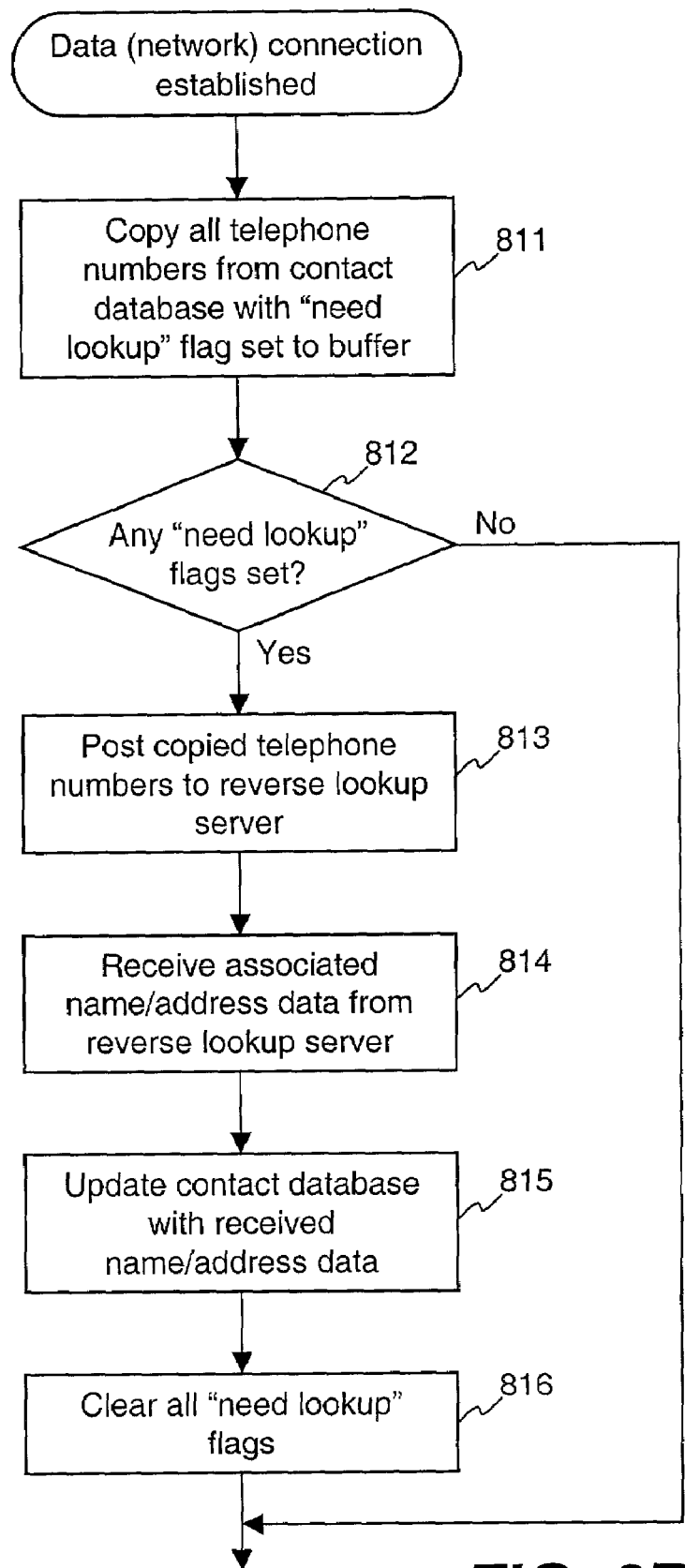

As noted above, many mobile device users do not use their contact databases, because they are unable or unwilling to enter or download their contact data. FIGS. 8A and 8B show browser processes that may be performed to automatically add name and address information (or other types of information) to a contact database in a wireless handset, based on Caller-ID information in either an incoming or an outgoing telephone call. These processes enable the user's contact database to be incrementally and automatically populated each time the user places or receives a call using the wireless handset. These processes, therefore, make the contact database of a wireless handset more usable for those users who are unable or unwilling to enter or download their contact data into the contact database. A populated contact database will tend to encourage these users to place more calls, increasing billable minutes before the wireless carrier. This technique will also benefit users who partially populate their contact databases manually and/or for automatic entry of data for subsequent contacts.

For each incoming or outgoing telephone call, the dialed telephone number is passed by the telephony unit 21 to the browser 22 as part of the call event data that indicates the telephone call to the browser 22. FIG. 8A shows a process performed by the browser 22 in response to receiving call event data representing either an incoming telephone call received by the wireless handset 20 or an outgoing telephone call placed by the user of the wireless handset 20.

The process is initiated when the browser 22 receives the call event data from the telephony unit 21. In response to the call event data, at block 801 the browser 22 determines whether the contact database 24 includes a telephone number matching the telephone number of the incoming or outgoing call. If the contact database 24 contains a matching telephone number, then at block 802 the browser 22 determines whether the contact database 24 includes data, such as a name or address, associated with the stored (matching) telephone number. If both blocks 801 and 802 are answered in the affirmative, the process ends. If, however, there is no matching telephone number in the contact database 24 (block 801), then at block 803 the browser 22 adds the telephone number of the incoming or outgoing call to the contact database 24 and then sets a "need lookup" flag for this contact entry, which ends the process. This state (flag) is saved at this time because it is assumed that a data (network) connection is not available, since a voice call is currently being attempted. If the contact database 24 includes a matching telephone number (block 801) but no associated data, the browser 22 sets the "need lookup" flag for this contact entry at block 804, and the process ends.

When the browser 22 is active and a data connection has been established via the wireless network 2, the browser 22 has an opportunity to find any data which is missing from the contact database 24. Accordingly, FIG. 8B shows a process by which the browser 22 automatically updates the contact database 24 when it is active and a data connection has been established. At block 811 the browser 22 copies into a buffer all telephone numbers in the contact database 24 for which the "need look up" flag has been set. If no "need lookup" flag is found to have been set at block 812, the process ends. If one or more "need lookup" flags are found to have been set at block 812, then the process proceeds with block 813, in which the browser 22 posts any telephone numbers in the buffer to a remote reverse lookup or vCard database server. The database server may be one of the servers 5 or any other processing system coupled (at least indirectly) to the wireless network 2. An example of a reverse lookup database server is the "555-1212.com" service provided at the Web site having the URL, "http://www.555-1212.com". Alternatively, the database server may be part of the proxy gateway 4.

Next, at block 814 the browser 22 receives the associated name and/or address data from the database server via the wireless network 2. The browser 22 then adds the received data to the contact database 24 at block 815. Finally, the process ends with block 816, in which the browser 22 clears all of the "need lookup" flags to prevent any further searching (which would be fruitless).

As can be seen from FIG. 8A, the next search request to the database server will be triggered by a new telephone number entry into the contact database 24 or the use (inbound or outbound) of a telephone number that is in the contact database but has no associated name or address data.

As can be seen, the above described processes enable a user's contact database to be incrementally and automatically populated each time the user places or receives a call using the wireless handset. These processes, therefore, make the contact database feature of a wireless handset more usable for many users.

Figure 9:
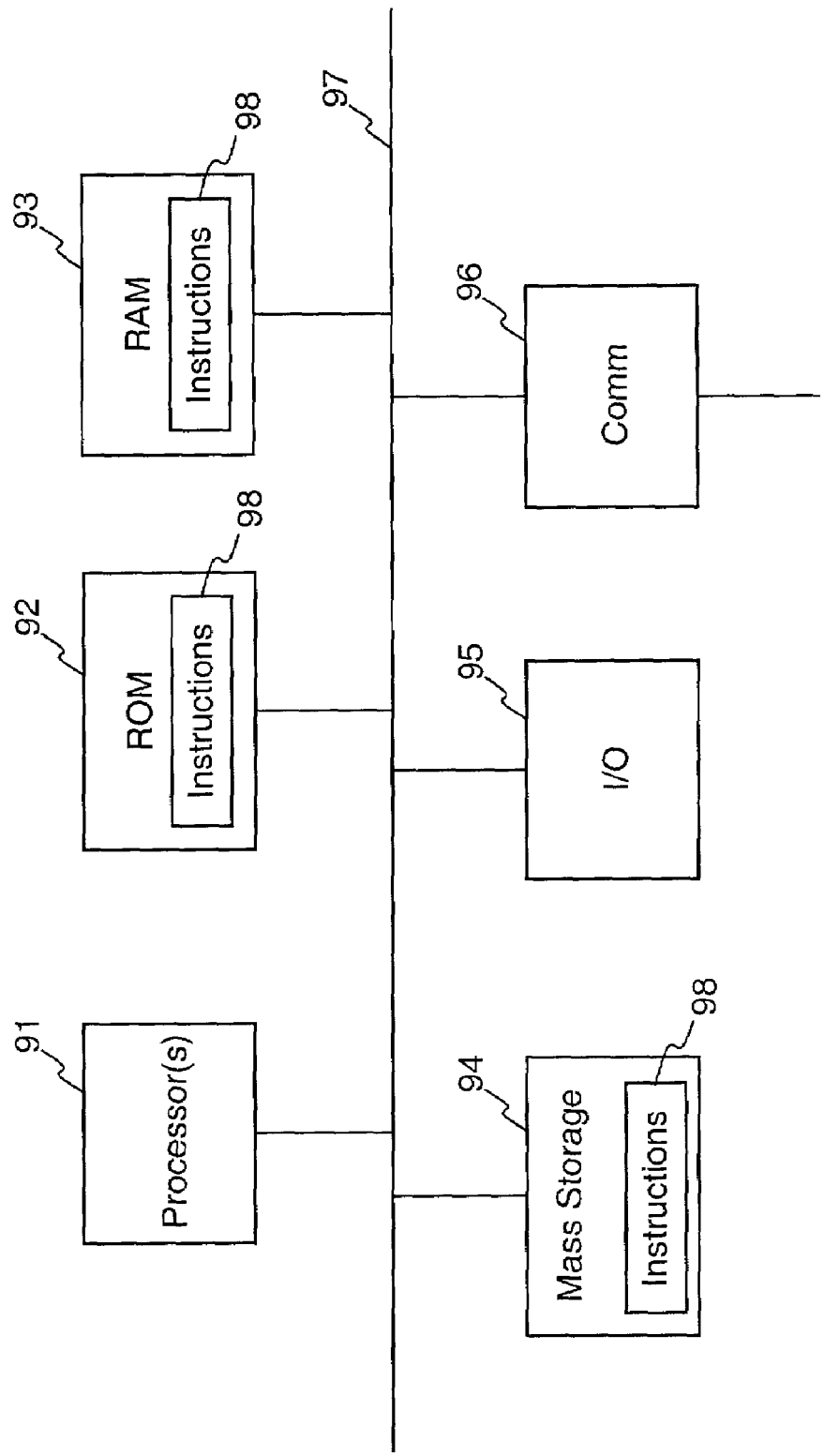
FIG. 9 is a high-level block diagram of a processing system representative of any of the processing devices or systems shown in FIG. 1.

FIG. 9 shows an abstraction of a processing system that may represent any of the processing devices or systems shown in FIG. 1 (i.e., a mobile device 1, proxy gateway 4, or a server 5). The illustrated system includes one or more processors 91, i.e. a central processing unit (CPU), read-only memory (ROM) 92, and random access memory (RAM) 93, which may be coupled to each other by a bus system 97. The processor(s) 91 may be, or may include, one or more programmable general-purpose or special-purpose microprocessors, digital signal processors (DSPs), programmable controllers, application specific integrated circuits (ASICs), programmable logic devices (PLDs), or a combination of such devices. The bus system 97 includes one or more buses or other connections, which may be connected to each other through various bridges, controllers and/or adapters, such as are well-known in the art. For example, the bus system 97 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

Also coupled to the bus system 97 are one or more mass storage devices 94, input/output (I/O) devices 95, and data communication devices 96. Each mass storage device 94 may be, or may include, any one or more devices suitable for storing large volumes of data in a non-volatile manner, such as a magnetic disk or tape, magneto-optical (MO) storage device, or any of various forms of Digital Versatile Disk (DVD) or Compact Disk (CD) based storage, or a combination thereof.

Each data communication device 96 is a device suitable for enabling the processing system to communicate with remote devices and may be, for example, a wireless transceiver (e.g., in the case of a mobile device), a conventional modem, a Digital Subscriber Line (DSL) modem, a cable modem, an Ethernet adapter, an Integrated Services Digital Network (ISDN) adapter, a satellite transceiver, or the like. The I/O device(s) 95 may include, for example, a keyboard or keypad, a display device, and a pointing device (e.g., a mouse, trackball, or touchpad). Note, however, that such I/O devices may be unnecessary for certain devices and/or in certain embodiments. For example, a device which functions purely as a server does not necessarily require local I/O devices in addition to a data communication device, particularly if the server is not intended to directly interface with a user or operator. Similarly, it may not be desirable (or practical) to equip a mobile device with a mass storage device. Many other variations on the above described embodiment are possible. Further, it will be understood that the processing system may include other conventional components such as are well-known in the art (e.g., RF signal processing circuitry in the case of a mobile device 1).

The processes described above may be implemented in software 98, which may reside, either partially or completely, in any of RAM 93, mass storage device 94 and/or ROM 92, as shown, or on a remote processing system.

Thus, a method and apparatus for using Caller-ID information in a browser of a mobile telephone or other communication device have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A mobile communication device comprising:
 a telephony unit in the mobile communication device to process telephony signals and to receive a signal indicating an incoming call over a wireless link, the signal including Caller-ID information; and
 a browser in the mobile communication device to enable a user to access and navigate hypermedia information, and further to receive the Caller-ID information from the telephony unit in response to the incoming call and, in response to receiving the Caller-ID information, to perform browsing based on the Caller-ID information without the user making any request for the browsing.

2. A mobile communication device as recited in claim 1, further comprising an output device to output a ring tone indicating the incoming call, wherein said action comprises the browser looking up ring tone data previously associated with the Caller-ID information, and wherein the output device is caused to output a ring tone based on the ring tone data.

3. A mobile communication device as recited in claim 2, wherein the incoming call originates from a caller, wherein the caller is a member of a predefined group of callers, and wherein the ring tone data represents a ring tone previously associated with the group.

4. A mobile communication device as recited in claim 2, wherein:
 the caller is a member of a predefined group of callers;
 the ring tone emulates a sound instrument previously associated with the group of callers; and
 the ring tone has an audible pattern previously associated specifically with the caller.

5. A mobile communication device as recited in claim 4, wherein the sound instrument is a musical instrument and the audible pattern is a melody.

6. A mobile communication device as recited in claim 1, further comprising a memory to store a local data structure, wherein said action comprises the browser looking up data of a predetermined type in the local data structure.

7. A mobile communication device as recited in claim 6, wherein the data comprises ring tone data.

8. A mobile communication device as recited in claim 6, wherein the data is stored in a vCard.

9. A mobile communication device as recited in claim 6, wherein the data comprises ring tone data stored in a vCard.

10. A mobile communication device as recited in claim 1, further comprising a memory to store data of a predetermined type, wherein the browser attempts to locate the data in the memory in response to receiving the Caller-ID information and, if the data is not found in the memory, the browser automatically attempts to obtain the data from a remote server via the wireless link during a subsequent data connection by the browser over the wireless link.

11. A mobile communication device as recited in claim 10, wherein the data comprises ring tone data associated with the Caller-ID information.

12. A mobile communication device as recited in claim 10, wherein the data is stored in a vCard.

13. A mobile communication device as recited in claim 12, wherein the data comprises ring tone data stored in a vCard and associated with the Caller-ID information.

14. A mobile communication device as recited in claim 1, further comprising a memory storing a local data structure, wherein said action comprises the browser obtaining data of a predetermined type from a remote processing system via the wireless link and automatically updating the local data structure using the data obtained from the remote processing system.

15. A mobile communication device as recited in claim 14, wherein the data comprises ring tone data.

16. A mobile communication device as recited in claim 14, wherein the data is stored in a vCard.

17. A mobile communication device as recited in claim 14, wherein the data comprises ring tone data stored in a vCard.

18. A mobile communication device as recited in claim 1, wherein said action comprises the browser signaling the telephony unit to initiate an outgoing call in response to the incoming call.

19. A mobile communication device as recited in claim 18, wherein the incoming call originates from a source, the source having a telephone number, and wherein the outgoing call is placed to a telephone number other than the telephone number of the source.

20. A mobile telephone comprising:
a communications interface in the mobile telephone to communicate voice and data with a remote site over a wireless network;
an output device in the mobile telephone to output a ring tone indicating an incoming telephone call from a caller;
a memory in the mobile telephone storing a browser to enable a user of the mobile telephone to access hypermedia information stored on a remote processing system via the wireless network and to navigate the hypermedia information; and
a telephony unit to process telephony signals, to receive a signal indicating the incoming telephone call, the signal including Caller-ID information, and to provide the Caller-ID information to the browser;
wherein the browser uses the Caller-ID information to look up ring tone data previously associated with the caller and to provide the ring tone data to the telephony unit, without the user making any request to look up the ring tone data such that the telephony unit causes the output device to output the ring tone based on the ring tone data provided by the browser.

21. A mobile telephone as recited in claim 20, further comprising a local data structure, wherein the browser obtains the ring tone data from the local data structure.

22. A mobile telephone as recited in claim 20, wherein the ring tone data is stored in a remote processing system, such that the browser obtains the ring tone data from the remote processing system via the wireless network.

23. A mobile telephone as recited in claim 22, further comprising a local data structure, wherein the browser automatically updates the local data structure using the ring tone data obtained from the remote processing system.

24. A mobile telephone as recited in claim 20, further comprising a local data structure to store ring tone data, wherein the browser attempts to locate the ring tone data in the local data structure in response to receiving the Caller-ID information and, if the ring tone data is not found in the local data structure, the browser automatically attempts to obtain the ring tone data from a remote server via the wireless network during a subsequent data connection by the browser over the wireless network.

25. A mobile telephone as recited in claim 24, wherein the browser automatically updates the local data structure using the ring tone data obtained from the remote server.

26. A mobile telephone as recited in claim 20, wherein the ring tone data is stored in a vCard.

27. A mobile telephone as recited in claim 26, wherein the ring tone data is stored in a vCard previously defined by the caller.

28. A mobile telephone as recited in claim 20, wherein the caller is a member of a predefined group of callers, and wherein the ring tone data represents a ring tone previously associated with the group.

29. A mobile telephone as recited in claim 20, wherein:
the caller is a member of a predefined group of callers;
the ring tone emulates a sound instrument previously associated with the group of callers; and
the ring tone has an audible pattern previously associated specifically with the caller.

30. A mobile telephone as recited in claim 29, wherein the sound instrument is a musical instrument and the audible pattern is a melody.

31. A machine-readable storage medium storing a browser for use in a mobile telephone configured to operate on a wireless network, the browser to enable a user of the mobile telephone to access and navigate hypermedia information from the mobile telephone, wherein the browser, when executed, performs a process comprising:
the browser receiving Caller-ID information associated within an incoming telephone call to the mobile telephone; and
the browser performing browser based on the Caller-ID information, in response to receiving the Caller-ID information, without the user making any request for the browsing.

32. A machine-readable storage medium as recited in claim 31, wherein the predetermined action comprises looking up ring tone data previously associated with the Caller-ID information, such that the mobile telephone outputs a ring tone based on the ring tone data.

33. A machine-readable storage medium as recited in claim 32, wherein the incoming telephone call originates from a caller, wherein the caller is a member of a predefined group of callers, and wherein the ring tone data represents a ring tone previously associated with the group.

34. A machine-readable storage medium as recited in claim 32, wherein:
the caller is a member of a predefined group of callers;
the ring tone emulates a sound instrument previously associated with the group of callers; and
the ring tone has an audible pattern previously associated specifically with the caller.

35. A machine-readable storage medium as recited in claim 34, wherein the sound instrument is a musical instrument and the audible pattern is a melody.

36. A machine-readable storage medium as recited in claim 31, wherein the predetermined action comprises looking up data of a predetermined type in a data structure within the mobile telephone.

37. A machine-readable storage medium as recited in claim 36, wherein the data comprises ring tone data.

38. A machine-readable storage medium as recited in claim 36, wherein the data is stored in a vCard.

39. A machine-readable storage medium as recited in claim 36, wherein the data comprises ring tone data stored in a vCard.

40. A machine-readable storage medium as recited in claim 31, wherein the predetermined action comprises automatically attempting to locate the data in a local memory in response to receiving the Caller-ID information and, if the data is not found in the memory, automatically attempting to obtain the data from a remote server via the wireless network during a subsequent data connection by the browser over the wireless network.

41. A machine-readable storage medium as recited in claim 40, wherein the data comprises ring tone data.

42. A machine-readable storage medium as recited in claim 40, wherein the data is stored in a vCard.

43. A machine-readable storage medium as recited in claim 40, wherein the data comprises ring tone data stored in a vCard.

44. A machine-readable storage medium as recited in claim 31, wherein the predetermined action comprises obtaining data of a predetermined type from a remote processing system via the wireless network and automatically updating the local data structure using the data obtained from the remote processing system.

45. A machine-readable storage medium as recited in claim 44, wherein the data comprises ring tone data.

46. A machine-readable storage medium as recited in claim 44, wherein the data is stored in a vCard.

47. A machine-readable storage medium as recited in claim 44, wherein the data comprises ring tone data stored in a vCard.

48. A machine-readable storage medium as recited in claim 31, wherein the predetermined action comprises signaling a telephony unit in the mobile telephone to initiate an outgoing call in response to the incoming call.

49. A machine-readable storage medium as recited in claim 31, wherein the incoming call originates from a source, the source having a telephone number, and wherein the outgoing call is placed to a telephone number other than the telephone number of the source.

50. A method of executing a browser in a mobile communication device configured to communicate voice and data over a wireless network, the browser to enable a user of the mobile communication device to access and navigate hypermedia data, the method in the browser comprising:
receiving Caller-ID information in response to the mobile communication device receiving a signal indicating an incoming voice call over a wireless network; and
performing browsing based on the Caller-ID information, without the user making any request for the browsing.

51. A method as recited in claim 50, wherein automatically executing a predetermined action comprises looking up ring tone data previously associated with the Caller-ID information, the method further comprising outputting a ring tone based on the ring tone data.

52. A method as recited in claim 51, wherein the incoming voice call originates from a caller, wherein the caller is a member of a predefined group of callers, and wherein the ring tone data represents a ring tone previously associated with the group.

53. A method as recited in claim 51, wherein:
the caller is a member of a predefined group of callers;
the ring tone emulates a sound instrument previously associated with the group of callers; and
the ring tone has an audible pattern previously associated specifically with the caller.

54. A method as recited in claim 53, wherein the sound instrument is a musical instrument and the audible pattern is a melody.

55. A method as recited in claim 50, wherein automatically executing a predetermined action comprises looking up data of a predetermined type in a data structure within the mobile communication device.

56. A method as recited in claim 55, wherein the data comprises ring tone data.

57. A method as recited in claim 55, wherein the data is stored in a vCard.

58. A method as recited in claim 55, wherein the data comprises ring tone data stored in a vCard.

59. A method as recited in claim 50, wherein automatically executing a predetermined action comprises automatically attempting to locate data of a predetermined type in a local memory in response to receiving the Caller-ID information and, if the data is not found in the memory, automatically attempting to obtain the data from a remote server via the wireless network during a subsequent data connection by the browser over the wireless network.

60. A method as recited in claim 59, wherein the data comprises ring tone data associated with the Caller-ID information.

61. A method as recited in claim 59, wherein the data is stored in a vCard.

62. A method as recited in claim 59, wherein the data comprises ring tone data stored in a vCard and associated with the Caller-ID information.

63. A method as recited in claim 50, wherein automatically executing a predetermined action comprises obtaining data of a predetermined type from a remote processing system via the wireless network and automatically updating the local data structure using the data obtained from the remote processing system.

64. A method as recited in claim 63, wherein the data comprises ring tone data associated with the Caller-ID information.

65. A method as recited in claim 63, wherein the data is stored in a vCard.

66. A method as recited in claim 63, wherein the data comprises ring tone data stored in a vCard and associated with the Caller-ID information.

67. A method as recited in claim 50, wherein automatically executing a predetermined action comprises causing the mobile communication device to initiate an outgoing voice call in response to the incoming voice call.

68. A method as recited in claim 67, wherein the incoming voice call originates from a source, the source having a telephone number, and wherein the outgoing voice call is placed to a telephone number other than the telephone number of the source.

69. A method of operating a browser in a mobile telephone configured to communicate voice and data over a wireless network, the browser to enable a user of the mobile telephone to access and navigate hypermedia data, the method comprising:
receiving Caller-ID information at the browser in response to the mobile telephone receiving a signal indicating an incoming telephone call over the wireless network;
in response to receiving the Caller-ID information, automatically attempting to locate ring tone data associated with the Caller-ID information in a contact database within the mobile telephone;
if the ring tone data is found in the contact database, then outputting the ring tone data to a telephony unit of the mobile telephone, the outputted ring tone data for use in generating a ring tone indicating the incoming telephone call;
if the ring tone data is not found in the contact database, then
waiting to establish a data connection with a remote server via the wireless network, and when the data connection is established,
automatically requesting the ring tone data from the remote server via the wireless network,
receiving the ring tone data via the wireless network, and
storing the ring tone data in the contact database in association with the Caller-ID information.

70. A method as recited in claim 69, wherein the ring tone data is stored in a vCard.

* * * * *